US008190700B2

(12) United States Patent
Herrmann et al.

(10) Patent No.: US 8,190,700 B2
(45) Date of Patent: *May 29, 2012

(54) CONDITIONAL ACCESS SYSTEM AND METHOD

(75) Inventors: Mark E. Herrmann, Boston, MA (US);
Steven N. Kane, Boston, MA (US);
Stuart Roseman, Boston, MA (US);
Jason Yanowitz, Cambridge, MA (US)

(73) Assignee: Scientific Games Holdings Limited, Co. Longford (IE)

( * ) Notice: Subject to any disclaimer, the term of this patent is extended or adjusted under 35 U.S.C. 154(b) by 0 days.

This patent is subject to a terminal disclaimer.

(21) Appl. No.: 12/589,632

(22) Filed: Oct. 26, 2009

(65) Prior Publication Data

US 2010/0115274 A1 May 6, 2010

Related U.S. Application Data

(63) Continuation of application No. 10/793,168, filed on Mar. 4, 2004, now Pat. No. 7,610,486.

(60) Provisional application No. 60/451,888, filed on Mar. 4, 2003.

(51) Int. Cl.
*G06F 15/167* (2006.01)
*A63F 13/00* (2006.01)

(52) U.S. Cl. .......... 709/213; 709/219; 705/26.1; 463/16

(58) Field of Classification Search .................. 709/214; 463/16

See application file for complete search history.

(56) References Cited

U.S. PATENT DOCUMENTS

| 4,658,093 | A | * | 4/1987 | Hellman ........................ 705/52 |
| 5,181,107 | A | * | 1/1993 | Rhoades ........................ 725/105 |
| 5,630,204 | A | * | 5/1997 | Hylton et al. .................. 725/116 |
| 5,654,746 | A | * | 8/1997 | McMullan et al. ............. 725/29 |
| 5,677,905 | A | * | 10/1997 | Bigham et al. ........... 370/395.21 |
| 5,734,589 | A | * | 3/1998 | Kostreski et al. ............. 715/716 |
| 6,253,193 | B1 | * | 6/2001 | Ginter et al. ..................... 705/57 |
| 6,263,313 | B1 | * | 7/2001 | Milsted et al. ..................... 705/1 |
| 6,327,652 | B1 | * | 12/2001 | England et al. .................. 713/2 |
| 6,363,149 | B1 | * | 3/2002 | Candelore ........................ 380/45 |
| 6,363,357 | B1 | * | 3/2002 | Rosenberg et al. ............. 705/26 |

(Continued)

FOREIGN PATENT DOCUMENTS

EP 0461029 A 12/1991

(Continued)

OTHER PUBLICATIONS

"Functional Model of a Conditional Access System" EBU Review-Technical, European Broadcasting Union, Brussels, BE No. 266, 1995, pp. 64-77. XP002251132 ISSN: 0251-0936.

(Continued)

*Primary Examiner* — Evens J Augustin
(74) *Attorney, Agent, or Firm* — Dority & Manning, P.A.

(57) ABSTRACT

The present invention relates to methods of and systems for providing conditional access to electronic content. Electronic content is provided to a user along with authorization information. The electronic content may be transmitted to the user, and the user may use the authorization information to access the electronic content. An authorization code may be provided to the user such that the user may be granted access to the content based on a comparison of the provided authorization code and a second authorization code transmitted with the electronic content, and transmission of the second authorization code may be controlled by a content provider to control access by the user.

69 Claims, 6 Drawing Sheets

U.S. PATENT DOCUMENTS

| | | | |
|---|---|---|---|
| 6,418,421 B1* | 7/2002 | Hurtado et al. | 705/54 |
| 6,574,609 B1* | 6/2003 | Downs et al. | 705/50 |
| 6,599,194 B1* | 7/2003 | Smith et al. | 463/30 |
| 6,697,489 B1* | 2/2004 | Candelore | 380/200 |
| 6,769,989 B2* | 8/2004 | Smith et al. | 463/41 |
| 6,820,063 B1* | 11/2004 | England et al. | 705/54 |
| 6,834,110 B1* | 12/2004 | Marconcini et al. | 380/239 |
| 6,871,188 B2* | 3/2005 | De Souza | 705/26.8 |
| 6,978,022 B2* | 12/2005 | Okimoto et al. | 380/211 |
| 7,080,397 B2* | 7/2006 | Cochran et al. | 725/87 |
| 7,233,948 B1* | 6/2007 | Shamoon et al. | 1/1 |
| 7,865,567 B1* | 1/2011 | Hendricks et al. | 709/214 |
| 2001/0046299 A1* | 11/2001 | Wasilewski et al. | 380/282 |
| 2002/0044658 A1* | 4/2002 | Wasilewski et al. | 380/239 |
| 2004/0152504 A1* | 8/2004 | Herrmann et al. | 463/16 |

FOREIGN PATENT DOCUMENTS

| | | |
|---|---|---|
| EP | 0723371 A | 7/1996 |
| WO | 98/43433 A | 10/1998 |

OTHER PUBLICATIONS

First Office Action Dated Aug. 4, 2010 in corresponding Canadian Application No. 2,518,075.

* cited by examiner

CONDITIONAL ACCESS SYSTEM AND METHOD

RELATED APPLICATIONS

This application is a continuation of and claim priority under 35 U.S.C. §120 to U.S. application Ser. No. 10/793,168, filed Mar. 4, 2004 entitled "CONDITIONAL ACCESS SYSTEM AND METHOD" which claims priority under 35 U.S.C. §119(e) to U.S. Provisional Application Ser. No. 60/451,888, entitled "CONDITIONAL ACCESS SYSTEM AND METHOD," filed on Mar. 4, 2003, which applications are herein incorporated by reference in their entirety.

FIELD OF THE INVENTION

The present invention relates to methods of and systems for providing conditional access to electronic content.

DESCRIPTION OF THE RELATED ART

Television (TV) programming and other kinds of broadcast services are commonly available to the public via subscription from the respective providers, such as cable and satellite TV service providers. Programming content typically includes local broadcast and cable TV programming, pay-per-view (PPV) programs and additional services including music and interactive television (iTV) programming such as games. To implement appropriate access restrictions on individual customers according to content for which they have paid, the broadcast signals are scrambled or encrypted, and an electronic set top box (STB) with specific descrambling capabilities is supplied by the service providers to each of their customers to allow each customer to access the programming that he/she has paid for in unscrambled form. In the broadcasting art, the selective descrambling of broadcast signals is commonly referred to as conditional access (CA) control and the programming and other services that require such descrambling by the service recipients (e.g., PPV programs) are often referred to as CA services.

To implement conditional access control, different programming content carried by broadcast signals are typically encrypted using different encryption schemes. For example, the programming content of a PPV movie channel is usually encrypted differently from that of a PPV sports channel, such that a separate decryption scheme is required to gain access to the descrambled content of each PPV channel. On the other hand, an STB is typically equipped with a few slots, each of which can accept a physical card, e.g., a PCMCIA card or a smart card. Each electronic card enables the STB to descramble or decrypt the contents of a limited number of channels. Thus, by providing the appropriate card(s) in the STBs based on their individual subscriptions, the service providers can control the programming content that each customer is able to access accordingly.

Older systems that perform conditional access require the insertion of traps or filters in the line between the service provider and the STB. A different trap or filter might be needed for each channel or package of channels. Depending upon the system, the traps or filters may be located outside at the split from the common line for a specific user to anywhere up to the back of the STB.

U.S. Pat. No. 6,154,206 and related art disclose CA systems and methods that utilize a second frequency for sending the descrambling information simultaneous to the scrambled broadcast signal on a regular channel. This is referred to in the art as out-of-band (OOB) processing.

SUMMARY OF THE INVENTION

There is a need for new methods and systems for performing conditional access to electronic content. According to one aspect of the present invention, a method for performing conditional access is provided that involves only one-way communication from a content provider to a user on a single frequency or channel but still provides security for allowing only authorized individuals to have access to the protected electronic content. According to one aspect of the present invention, a method is provided for providing conditional access to electronic content. The method comprises acts of providing electronic content to at least one user, providing, to the at least one user, authorization information associated with the electronic content, and permitting use of the electronic content if the authorization information indicates that the at least one user is authorized to use the electronic content.

In one embodiment of the invention, the act of providing authorization information includes an act of providing an authorization code, and the method further comprises an act of providing the authorization code to the at least one user. In another embodiment, the method further comprises an act of permitting the at least one user to submit the provided authorization code. In another embodiment, the method further comprises an act of permitting the at least one user to submit the authorization code to a system onto which the electronic content is downloaded. In one embodiment of the invention, the electronic content is at least one of a group comprising music, audio, software, video and a game. In one embodiment of the invention, the act of providing the electronic content includes an act of downloading the electronic content to at least one system including at least one of a group comprising a set top box, a computer, a handheld computer and a telephone. In another embodiment of the invention, the act of providing the electronic content includes an act of downloading the electronic content from at least one of a cable television system and a satellite television system. In one embodiment of the invention, the act of downloading the electronic content includes an act of downloading the electronic content to a random access memory of the at least one system. In another embodiment of the invention, the act of permitting use of the electronic content further comprises an act of displaying video information on a screen to the at least one user. In one embodiment of the invention, the act of displaying video information comprises an act of displaying the video information on a television to the at least one user.

In one embodiment of the invention, the act of displaying the video information further comprising displaying a game to the at least one user. In another embodiment of the invention, at least a portion of the electronic content is a software program downloaded to a system associated with the at least one user. In another embodiment of the invention, the act of permitting use of the electronic content includes an act of permitting use of the software program by the at least one user. In one embodiment of the invention, the act of permitting use of the software program includes an act of allowing the software to view at least a second portion of the electronic content.

In another embodiment of the invention, the method further comprises an act of maintaining the authorization information for a finite period of time. In one embodiment of the invention, the finite period is a period of a game session. In one embodiment of the invention, the act of providing authorization information to the user comprises acts of transmitting, to a system associated with the at least one user, a second authorization code, comparing the second authorization code to the provided authorization code, and determining whether the at least one user is authorized to use the electronic content based on the act of comparing. In another embodiment of the invention, the act of determining includes an act of allowing access to the electronic content if the act of comparing determines that the provided authorization code and the second authorization code match. In one embodiment of the invention, the act of determining includes an act of denying access to the electronic content if the act of comparing determines that the provided authorization code and the second authorization code do not match. In another embodiment of the invention, the act of transmitting the second authorization code includes an act of transmitting the second authorization code with at least one portion of the electronic content. In one embodiment of the invention, the second authorization code is transmitted in encrypted form to the system associated with the at least one user, and is decrypted by the system. In one embodiment of the invention, the provided authorization code is encrypted by the system associated with the to at least one user and compared to the transmitted encrypted second authorization code.

According to another aspect of the invention, a computer-readable medium is provided having computer-readable signals stored thereon that define instructions that, as a result of being executed by a computer, instruct the computer to perform a method for providing conditional access to electronic content. The method comprises acts of providing electronic content to at least one user, providing, to the at least one user, authorization information associated with the electronic content, and permitting use of the electronic content if the authorization information indicates that the at least one user is authorized to use the electronic content.

In one embodiment of the invention, the act of providing authorization information includes an act of providing an authorization code, and the method further comprises an act of providing the authorization code to the at least one user. In another embodiment of the invention, the method further comprises an act of permitting the at least one user to submit the provided authorization code. In another embodiment of the invention, the method further comprises an act of permitting the at least one user to submit the authorization code to a system onto which the electronic content is downloaded. In another embodiment of the invention, the electronic content is at least one of a group comprising music, audio, software, video and a game. In one embodiment of the invention, the act of providing the electronic content includes an act of downloading the electronic content to at least one system including at least one of a group comprising a set top box, a computer, a handheld computer and a telephone.

In one embodiment of the invention, the act of providing the electronic content includes an act of downloading the electronic content from at least one of a cable television system and a satellite television system. In one embodiment of the invention, the act of downloading the electronic content includes an act of downloading the electronic content to a random access memory of the at least one system. In one embodiment of the invention, the act of permitting use of the electronic content further comprises an act of displaying video information on a screen to the at least one user. In one embodiment of the invention, the act of displaying video information comprises an act of displaying the video information on a television to the at least one user. In one embodiment of the invention, the act of displaying the video information further comprising displaying a game to the at least one user. In another embodiment of the invention, at least a portion of the electronic content is a software program downloaded to a system associated with the at least one user. In one embodiment of the invention, the act of permitting use of the electronic content includes an act of permitting use of the software program by the at least one user. In one embodiment of the invention, the act of permitting use of the software program includes an act of allowing the software to view at least a second portion of the electronic content.

In one embodiment of the invention, the method further comprises an act of maintaining the authorization information for a finite period of time. In another embodiment of the invention, the finite period is a period of a game session. In one embodiment of the invention, the act of providing authorization information to the user comprises acts of transmitting, to a system associated with the at least one user, a second authorization code, comparing the second authorization code with the provided authorization code, and determining whether the at least one user is authorized to use the electronic content based on the act of comparing.

In one embodiment of the invention, the act of determining includes an act of allowing access to the electronic content if the act of comparing determines that the provided authorization code and the second authorization code match. In one embodiment of the invention, the act of determining includes an act of denying access to the electronic content if the act of comparing determines that the provided authorization code and the second authorization code do not match. In one embodiment of the invention, the act of transmitting the second authorization code includes an act of transmitting the second authorization code with at least one portion of the electronic content. In one embodiment of the invention, the second authorization code is transmitted after encryption and is decrypted after transmission by the system associated with the at least one user. In one embodiment of the invention, the provided authorization code is encrypted by the system associated with the at least one user and compared to the transmitted encrypted second authorization code.

According to another aspect of the present invention, a system is provided for providing conditional access to electronic content. The system comprises a receiver that receives electronic content and authorization information associated with the electronic content, and an authorization component that permits use, by at least one user, of the received electronic content if the authorization information indicates that the at least one user is authorized to use the electronic content.

In one embodiment of the invention, the receiver is adapted to receive an to authorization code associated with the at least one user. In another embodiment of the invention, the system further comprises an interface that accepts, from the at least one user, the received authorization code. In one embodiment of the invention, the electronic content is at least one of a group comprising music, audio, software, video and a game. In one embodiment of the invention, the system is at least one of a group comprising a set top box, a computer, a handheld computer and a telephone. In one embodiment of the invention, the receiver is adapted to receive the electronic content from at least one of a cable television system and a satellite television system.

In another embodiment of the invention, the system further comprises a memory adapted to store the received electronic content. In one embodiment of the invention, the memory is a random access memory. In one embodiment of the invention, a display is adapted to display at least one portion of the electronic content to the at least one user. In one embodiment of the invention, the display is a television adapted to display the at least one portion of the electronic content to the at least one user. In one embodiment of the invention, the at least one portion of the electronic content displayed to the at least one user is a game.

In one embodiment of the invention, at least a portion of the received electronic content is a software program capable of being executed by the system. In another embodiment of the invention, the system further comprises means for allowing the at least one user to use the software program. In another embodiment of the invention, the system further comprises means for allowing the at least one user to view at least a second portion of the electronic content if the at least one user is authorized. In another embodiment of the invention, the system further comprises means for maintaining the authorization information for a finite period of time. In one embodiment of the invention, the finite period is a period of a game session.

In one embodiment of the invention, the receiver is adapted to receive a second authorization code, and wherein the authorization component is adapted to compare the second authorization code with the authorization code associated with the at least one user and determine whether the at least one user is authorized to use the electronic content based on the comparison. In another embodiment of the invention, the authorization component is adapted to allow access to the electronic content if the authorization code associated with the at least one user and the second authorization code match. In one embodiment of the invention, the authorization component is adapted to deny access to the electronic content if the authorization code associated with the at least one user and the second authorization code do not match. In another embodiment of the invention, the receiver is configured to receive the second authorization code with at least one portion of the electronic content. In one embodiment of the invention, the receiver is adapted to receive the second authorization code in encrypted form, and is adapted to decrypt the received second authorization code. In one embodiment of the invention, the receiver is adapted to receive the second authorization code in encrypted form, and the authorization component is adapted to compare an encrypted form of the authorization code associated with the at least one user with the encrypted form of the second authorization code.

The function and advantage of these and other embodiments of the present invention will be more fully understood from the examples described below. The following examples are intended to illustrate the benefits of the present invention, but do not exemplify the full scope of the invention.

DETAILED DESCRIPTION OF THE INVENTION

According to one aspect of the invention, a new conditional access method is provided for accessing electronic content. Various aspects of the invention may be used to access any information including, but not limited to, interactive television programs, web content or for accessing software programs, games, music or other electronic content.

Existing conditional access methods have numerous different shortcomings. These shortcomings may include, for example, the use of expensive additional channels or frequencies to send access codes, keys, seeds and/or tables that also reduce the number of usable channels for content or the use of easily copied smart cards, traps or filters to scramble and unscramble (encrypt and decrypt) signals. Other methods may require sending the allowed access for every node on a network in a lengthy and expensive data stream integrated with the content data stream. Still other methods may require two-way communication between each STB and the network, thus increasing the necessary complexity of the STB, transmitter and network.

A big drawback of these methods is that they require that the cable operator implement and control methods for performing conditional access. This necessary control generally involves the cable operator implementing hardware and/or software and support personnel to enable a customer (e.g., a user of the content) to access a particular program. However, according to one aspect of the invention, it is realized that it would be beneficial for a content provider to be able to control access to programming without the need for intervention or participation by the cable operator. According to one embodiment of the invention, a provider is allowed to control access to content by a customer.

According to one embodiment of the invention, electronic content is provided to a user along with authorization information. The electronic content may be downloaded to the user (e.g., via a communication network) and the user may use the authorization information to access the electronic content.

Figure 1:
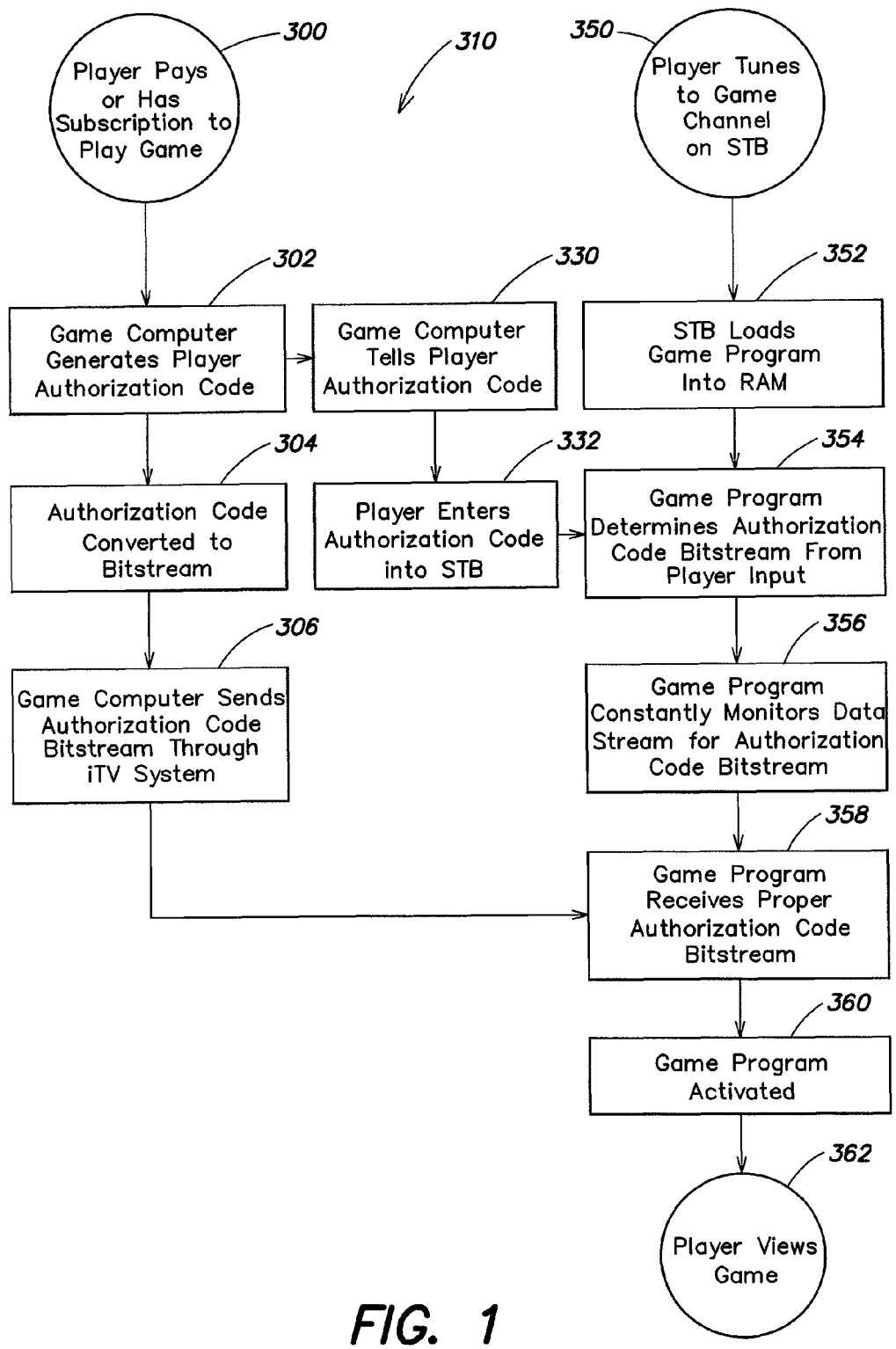
FIG. 1 is a flow chart of a process for obtaining access to electronic content according to one embodiment of the present invention.

FIG. 1 shows an example process for performing conditional access according to one embodiment of the invention. Process 310 may begin with a player paying or subscribing to play a game at block 300. A player may pay for content on interactive television using any known method including by telephone, the Internet, cashier and/or pay-per-view using any known payment type including cash, credit card, debit card and/or loyalty account. Methods for accepting payment for interactive television content are well-known. Although process 310 shows a conditional access method for viewing a game on interactive television, it should be appreciated that similar methods may be used for CA for downloading, viewing or using software and other electronic content according to various aspects of the invention and that the invention is not limited to any particular content.

In one embodiment of the invention, players may subscribe to play multiple consecutive games. That is, the player pays at one time to play many consecutive games (e.g., purchasing a subscription). The player may also choose to have his or her subscription automatically renewed.

According to another embodiment of the invention, the player may also enter to play using an alternative method of entry (AMOE). AMOE is a required available method of entry that does not require a purchase to enter a sweepstake; sweepstakes are usually used as a promotional or marketing tool. An individual entering a sweepstakes by AMOE is required by law to have the same odds of winning each of the available prizes.

A common AMOE method includes sending by the individual interested in entering the sweepstakes, a postcard with his or her name, address or other contact information. Another AMOE method includes signing on, by an individual, to a free Internet website and submitting the required information for free. Numerous other methods may be used for AMOE. Most sweepstakes limit the number of times one individual or family may enter a sweepstake by AMOE.

Once the player pays or enters to play a game, the game computer may choose an authorization code for the player at block 302. The authorization code may be chosen by any method. For example, the authorization code may be randomly generated, selected serially from a list or may be created using one or more portions of the player's information. At block 330, the player is informed of the authorization code. The player may be informed of the authorization code by any method, including an in-person notification, by e-mail, by regular mail, or by voice (e.g., via phone). Alternative to blocks 302 and 330, the player may be requested to choose an authorization code and the player inputs himself/herself (or the authorization code is inputted for him or her into the game computer on his/her behalf). As another alternative, if player information is used to generate the authorization code, the player may not be informed of his/her authorization code by a gaming operator or other entity (and thus block 330 may not be necessary) and the player is asked for his/her player information when accessing the game (e.g., by iTV) at block 332.

According to one embodiment, acts performed at blocks 300, 302 and 330 may occur in one transaction or session. For example, a player may subscribe to play one or more games using a cashier, the cashier enters the information into the game computer with a user interface, and the game computer generates the authorization code and prints out the code on the receipt for the cashier to hand the player. In another example, the player may pay to play a game using the telephone using an automated digital telephone (DTMF) system and have the authorization code relayed by electronic voice from the game computer to the player.

As used herein, a "user interface" or "UI" is an interface between a human user and a computer that enables communication between a user and a computer. Types of UIs include a graphical user interfaces (GUI), a display screen, a mouse, a keyboard, a keypad, a trackball, a microphone (e.g., to be used in conjunction with a voice recognition system), a speaker, a touch screen, a telephone, a game controller (e.g., a joystick) etc, and any combinations thereof.

However, it is possible that acts performed at blocks 300, 302 and 330 may not be desirable to have performed in one transaction or session, especially for security reasons. For example, a player that uses a pay-per-view system on the television network to subscribe to play games may have the authorization code automatically e-mailed to an account rather than be informed of the code over the television. Alternatively, a player subscribing to play may have the authorization code automatically determined by the set top box identifier.

In step 304, the game computer converts the authorization code into a bit stream. The authorization code conversion performed by the game computer follows an algorithm also provided in the game program. The bit stream associated with the authorization code may also include any additional information. Such additional information may include, for example, a player ID, a subscription start time, a subscription end time, subscription length and/or subscription level.

The game computer then inserts the authorization game code bit stream into the game channel data stream and broadcasts the data stream through an interactive television system or network (e.g., at block 306). The bit stream insertion may occur at any point in the data stream, may be required to be inserted at specific junctions in the data stream, and/or may be inserted only following a specific schedule. Each authorization code bit stream may be inserted as a single entity or may be bundled with other players' authorization code bit streams. It should be appreciated that the authorization code may be inserted into any portion of the bit stream, and the invention is not limited to any particular location.

To authorize use of the electronic content (e.g., a game program), a comparison is made between the code entered by the user and the authentication code transmitted to the user (e.g., via inserting the information into the bit stream). If the code does not match, the user is not allowed access to the content. If the code does match, the user is allowed access. The content provider can control access by the user without the intervention by the cable operator, for example, by discontinuing transmission of the code within the bit stream or by changing the transmitted code. The system on which content is viewed may be configured to deny access when a different code is received, or when code information is not received within a given amount of time (e.g., a game session).

According to one embodiment, the authorization code may also be active for only a short period of time. This periodic activation may be performed to prevent piracy of active authorization codes. In one embodiment, the user may be informed of the activation time period for the authorization code. Periodic activation may also be beneficial in controlling, by the game operator, access to its programming. For example, a period of time for which an authorization code may be active may be, for example, a period of a program (e.g., a game, series of games, displayed show, etc.) or portion thereof. It should be appreciated that any period may be used as an activation time period, and the invention is not limited to any particular period.

Preferably, acts performed at blocks 300 to 330 are coordinated and handled by a game operator independent of a television network operator. The advantage to having a game operator handle acts performed at blocks 300-330 is that the network operator need not worry about splicing or inserting information into the gaming operator's data stream and the equipment associated with it. Also, the gaming operator maintains integrity of its data stream from its computer system to the player, and is able to control access to its programming without interference by the network operator. Thus, the gaming operator may control access to its content independent from a television network operator (e.g., cable, satellite, or other provider).

The data stream may be transmitted without encryption from the gaming operator to the player. According to one embodiment of the invention, a system is provided that obviates the need for data encryption in the transmitted signal. More particularly, because downloaded game software is not active (and thus cannot generate the video content from the data stream) until an authorization code is received, encryption of the data stream is not necessary. However, encryption of the data stream may still be desirable for added security.

After the player receives his or her authorization code from the game computer, the player may then tune to the game channel using a set top box (e.g., at block 350). The STB may also download the game program from the data stream being sent on the tuned channel (e.g., at block 352). The game program may be downloaded or updated at any point before or during process 310.

At block 332, the player then inputs his or her authorization code into the STB (e.g., by using controls associated with the STB) and the game program converts the authorization code into a bit stream at block 354. At block 356, the game program executing on the STB then monitors (continuously, periodically according to a schedule, or at other points or frequencies) for the authorization code bit stream inserted into the game channel data stream by the game computer at block 306. Once the game program on the STB detects the authorization code bit stream, the game program is activated (at block 360), and the game channel data stream is converted by the game program into viewable content and the player views the game at block 362.

As an alternative to acts performed at blocks 354 and 356, the game program may constantly monitor and interpret the data stream. When the game program detects the interpreted data stream that matches the authorization code for the player, then the game program is activated at block 360.

Process 310 is merely one example method for performing conditional access according to one embodiment of the invention. Such an illustrative embodiment is not intended to limit the scope of the invention, as any of numerous other implementations of conditional access, for example, variations of conditional access, are possible and are intended to fall within the scope of the invention. For example, a password, user identification, STB address or any other player identifier may be used in place of an authorization code. None of the claims set forth below are intended to be limited to any particular implementation of conditional access unless such claim includes a limitation explicitly reciting a particular implementation.

Process 310 may include additional acts. Further, the order of the acts performed as part of process 310 is not limited to the order illustrated in FIG. 1, as the acts may be performed in other orders, and one or more of the acts of process 310 may be performed in series or in parallel to one or more other acts, or parts thereof. For example, acts performed at blocks 302 and 350, or parts thereof, may be performed in parallel, acts performed at block 332 may be performed at any point prior to acts performed at block 354, and acts performed at blocks 350 and 352 may be performed serially between acts performed at blocks 330 and 332 in the performance of process 310.

Process 310 is merely an illustrative embodiment of conditional access. Such an illustrative embodiment is not intended to limit the scope of the invention, as any of numerous other implementations of conditional access, for example, variations of process 310, are possible and are intended to fall within the scope of the invention. For example, process 310 may be used for providing access for downloading and accessing software, music, or other data/content on the Internet or other networks. None of the claims set forth below are intended to be limited to any particular implementation of conditional access unless such claim includes a limitation explicitly reciting a particular implementation.

Process 310, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. Such signals may define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBOL, etc., or any of a variety of combinations thereof. The computer-readable medium on which such instructions are stored may reside on one or more of the components of system 100 described below, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

It should be appreciated that any single component or collection of multiple components of a computer system, for example, the computer system described below in relation to FIGS. 5 and 6, that perform the functions described above with respect to describe or reference the method can be generically considered as one or more controllers that control the above-discussed functions. The one or more controllers can be implemented in numerous ways, such as with dedicated hardware, or using a processor that is programmed using microcode or software to perform the functions recited above.

Figure 2:
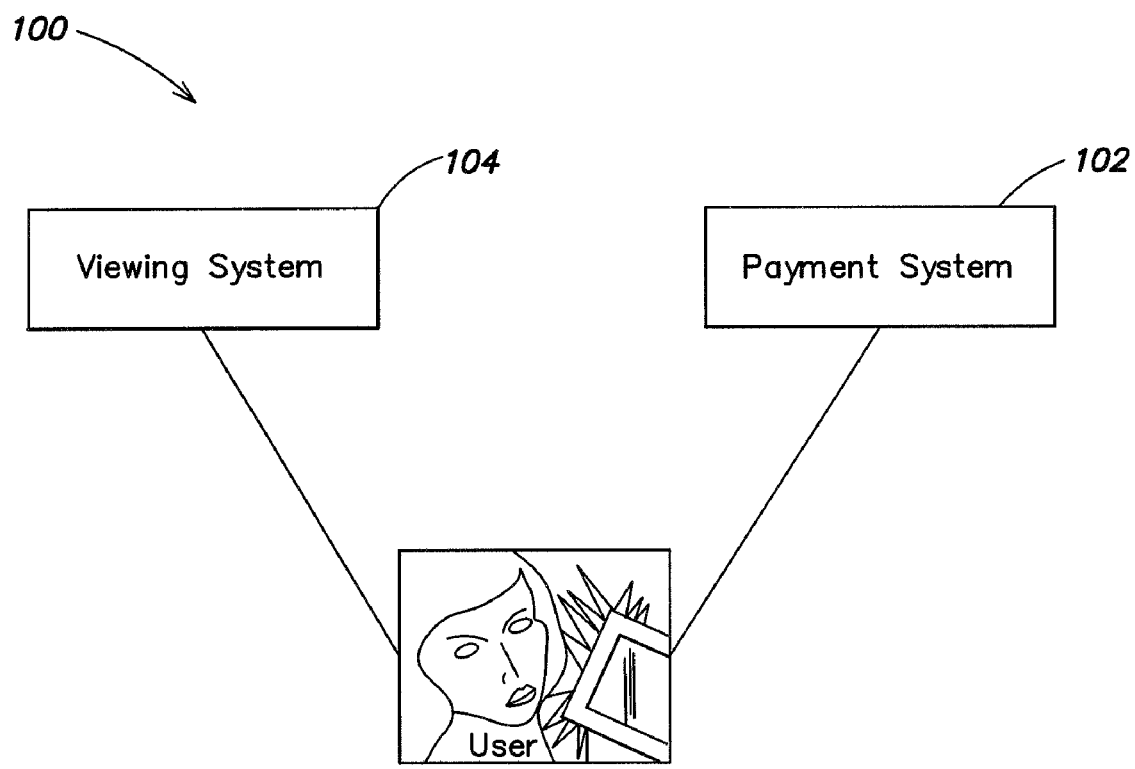
FIG. 2 is a block diagram showing basic components of a conditional access system according to one embodiment of the invention.
Figure 3:
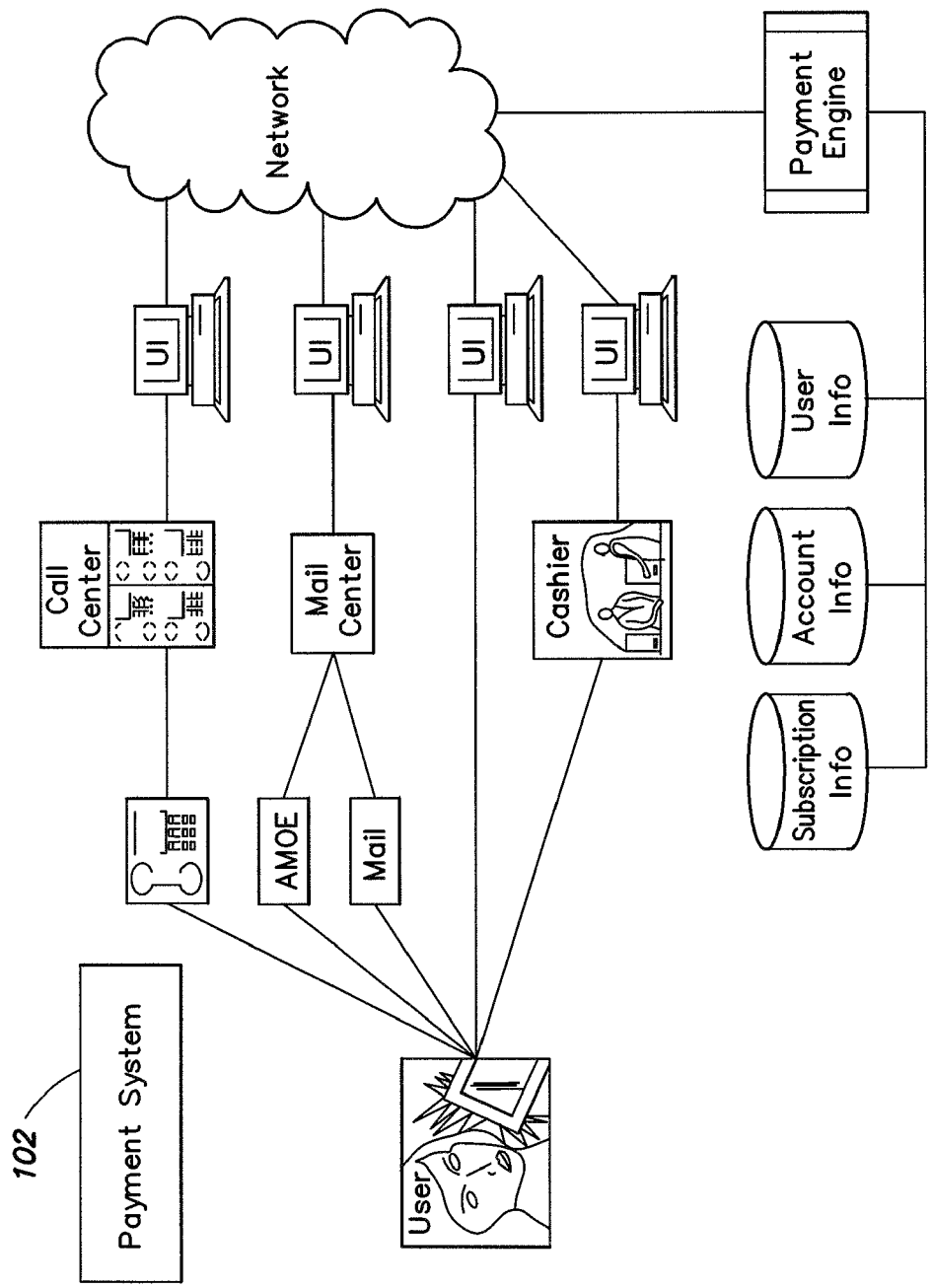
FIG. 3 is a block diagram showing basic components of a payment subsystem according to one embodiment of the invention.

As shown in FIG. 2, a computer system that performs a method for conditional access according to various embodiments may include two or more components. One system may handle payment, subscription and/or AMOE by users to play games, work with electronic content or download software or music and another system may handle generating and sending the video content. The computer system may also be connected by direct line or network to other computer systems including systems for third party software vendors, handling payouts (e.g. for winning), casino or hotel loyalty programs, reservations, in-room television viewing or gambling floor kiosks. Connections to other computer systems may be performed using one or more of the system components described below.

A payment system component may include one or many of a number of well-known systems. For example, a user may be able to pay for one or more games using a telephone and speaking with a call center representative who inputs user, payment and subscription information into a computer using a user interface. In the computer, user, payment, and subscription information may be stored in a data structure maintained in a memory of the computer system. As used herein, a "data structure" is an arrangement of data defined by computer-readable signals. These signals may be read by a computer system, stored on a medium associated with a computer system (e.g., in a memory, on a disk, etc.) and may be transmitted to one or more other computer systems over a communications medium such as, for example, a network.

User information may also be entered into a payment system component. User information that may be input may include name, address, telephone number and age. Payment information may include credit or debit card number or loyalty account information. Subscription information may include a first game session date and time, a number of game sessions to play, a number of game pieces per game session and a bet per game piece. Based upon the entered payment and subscription information, the call center representative may then verify that the payment information is valid and enough credit or funds is available for the user's desired subscription.

A similar system may exist for users entering using the mail or a post card AMOE, except the call center may be replaced by a mail center with representatives entering information into a data structure using a user interface. For example, a cashier that works at a casino with users who pay cash to play, may also have the ability to input user, account and subscription information using a user interface of a computer system.

Computer systems or pay engines for handling electronic or online payment and subscriptions may also be used. Such systems are well-known and include such systems as iKobo, Verisign, and other systems. Using such a system, a user interacts directly with the user interface to input information into the payment data structure that may be transferred to one or more payment systems (e.g., PayPal). Such user interfaces are well known; some examples include kiosks, pay-per-view television through a POP network and personal computers using the Internet or any network by phone, wireless or LAN connection.

A payment engine may also generate the authorization code for the user and store the code in an associated data structure. A payment engine may also inform the user of his or her authorization code by sending the code back through the network to be displayed on the user interface. If the user is paying directly using a user interface, then the player may read the authorization code his or herself. Otherwise, the player may be provided the authorization code by a cashier, call center or mail center. Other methods of notification may also be used including mail, e-mail or fax.

Various pay systems and the various user interfaces may be located on computer systems coupled by a network with the computer system(s) storing data including the player, account and subscription information. As used herein, a "network" or a "communications network" is a group of two or more devices interconnected by one or more segments of transmission media on which communications may be exchanged between the devices. Each segment may be any of a plurality of types of transmission media, including one or more electrical or optical wires or cables made of metal and/or optical fiber, air (e.g., using wireless transmission over carrier waves) or any combination of these transmission media.

The above are merely an illustrative embodiment of a pay system component. Such an illustrative embodiment is not intended to limit the scope of the invention, as any of numerous other implementations of the pay system, for example, variations of online payment, are possible and are intended to fall within the scope of the invention. For example, a payment system component may use in-room television systems. As another example of a payment system variation, the authorization code may be generated by the data engine described below rather than by the payment engine. A data engine may monitor the user info database and generate an authorization code when a new user is found. The data engine may then save the authorization code in the payment data structure and as mentioned previously, a payment engine may then send and display the authorization code on a user interface. None of the claims set forth below are intended to be limited to any particular implementation of a pay system unless such claim includes a limitation explicitly reciting a particular implementation.

Figure 4:
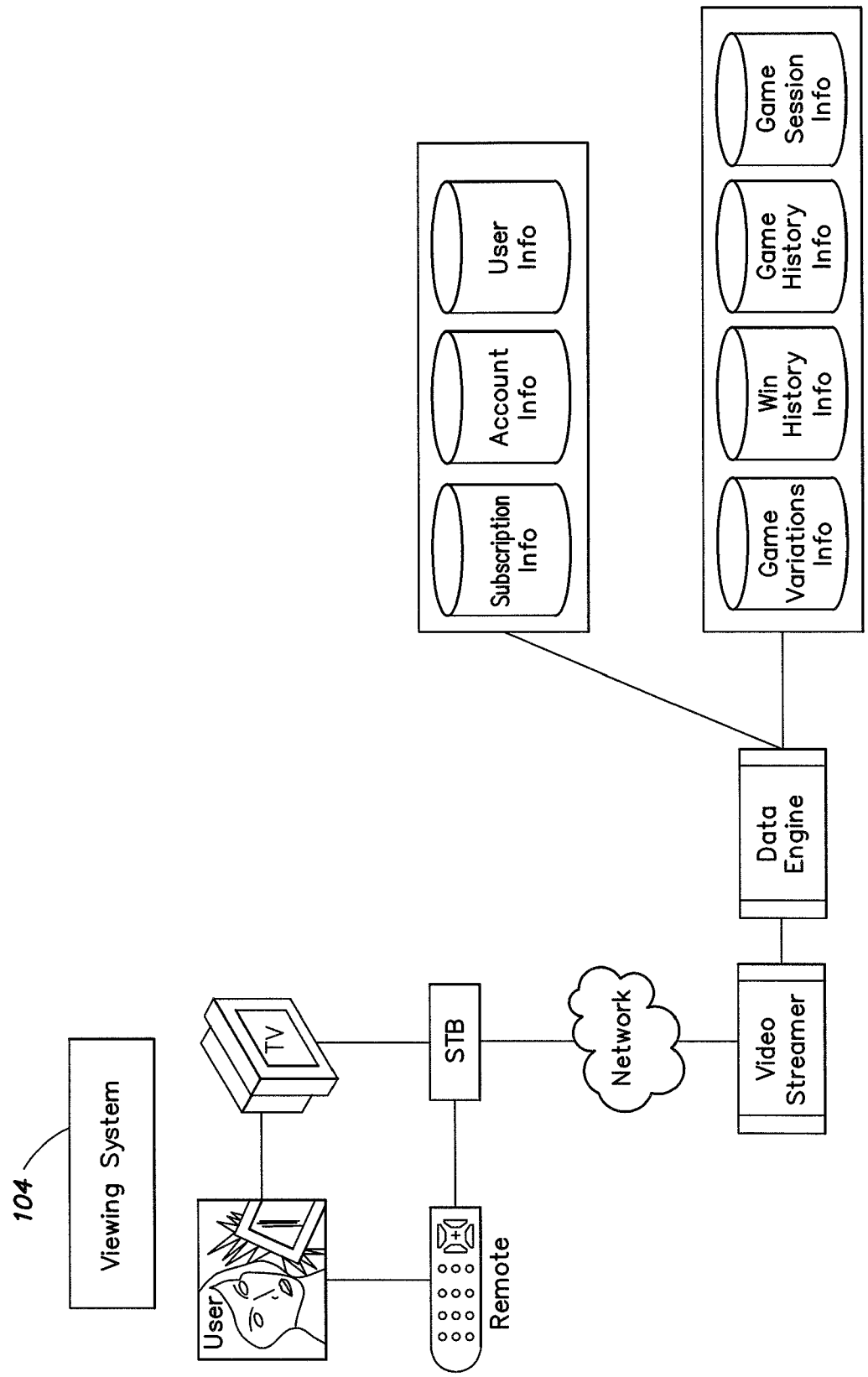
FIG. 4 is a block diagram showing basic components of a viewing subsystem according to one embodiment of the invention.

A viewing system may comprise of a number of components for performing specific functions. As shown in FIG. 4, components for a game viewing system may include storage system or devices that store data structures that contain game variations, present game session information, game session history, and win history. The viewing system may also include components used to access payment data structures. According to various embodiments of the invention, the data structure may contain downloadable video, music, software or other electronic content.

The viewing system may also include a data engine. In one example, the data engine may assemble the electronic content to be downloaded or viewed and attach or insert authorization codes and any other information. In a game system, the data engine may also generate and play a game.

Another component of the viewing system may include a driver that streams video via a network, such as broadband, satellite or wireless medium, to a set top box that controls television viewing. The video driver may read the electronic content, including software and authorization codes, generated by the data engine and convert the content into a video data stream. For interactive television, the video data stream may then be sent by network through national and/or local multi-service operators that distribute the data stream to the individual set top boxes.

The video streamer may also maintain the basic program in its own memory and constantly send the program in a video data stream and insert electronic content, including authorization codes and specific game information of a game system, from the data engine as needed.

The set top box or other interactive television system may have many different designs. Preferably, the set top box or other interactive television system may include random access memory into which data can be downloaded from a tuned channel or frequency. Preferably, the set top box also has an interface through which a user enters information. Such an interface may include entry buttons on the box and/or a wired or infrared remote controller. The set top box may also be a game controller including those readily available from Nintendo (Kyoto, Japan), Sony (Tokyo, Japan), Microsoft (Redmond, Wash., USA) or numerous other companies. The set top box may have the ability to perform, for example, acts performed in blocks 332 to 362 of FIG. 1.

In one embodiment, the set top box and television may be replaced by a personal computer, handheld or any other device that may download the data stream, allow the user to input the authorization code and utilize the electronic content. For a game system, these other devices may also allow viewing and/or playing a game.

The above is merely an illustrative embodiment of a viewing system. Such an illustrative embodiment is not intended to limit the scope of the invention, as any of numerous other implementations of a viewing system, for example, variations of viewing medium, are possible and are intended to fall within the scope of the invention. None of the claims set forth below are intended to be limited to any particular implementation of a viewing system unless such claim includes a limitation explicitly reciting a particular implementation.

System 100, and components thereof such as the payment and data engines, may be implemented using software (e.g., C, C#, C++, Java, or a combination thereof), hardware (e.g., one or more application-specific integrated circuits), firmware (e.g., electrically-programmed memory) or any combination thereof. One or more of the components of 100 may reside on a single system (e.g., the payment subsystem), or one or more components may reside on separate, discrete systems. Further, each component may be distributed across multiple systems, and one or more of the systems may be interconnected.

Further, on each of the one or more systems that include one or more components of 100, each of the components may reside in one or more locations on the system. For example, different portions of the components of 100 may reside in different areas of memory (e.g., RAM, ROM, disk, etc.) on the system. Each of such one or more systems may include, among other components, a plurality of known components such as one or more processors, a memory system, a disk storage system, one or more network interfaces, and one or more busses or other internal communication links interconnecting the various components.

System 100 may be implemented on a computer system described below in relation to FIGS. 5 and 6.

System 100 is merely an illustrative embodiment of the conditional access system. Such an illustrative embodiment is not intended to limit the scope of the invention, as any of numerous other implementations of the conditional access system, for example, variations of 100, are possible and are intended to fall within the scope of the invention. For example, a parallel system for viewing by interactive television may add additional video streamers specific for interactive television. None of the claims set forth below are intended to be limited to any particular implementation of the game system unless such claim includes a limitation explicitly reciting a particular implementation.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate play of the described game according to various embodiments of the invention. Further, the software design system may be located on a single computer or may be distributed among a plurality of computers attached by a communications network.

A general-purpose computer system according to one embodiment of the invention is configured to perform any of the described conditional access functions including but not limited to player subscription or payment, authorization code generation, electronic content generation and video transmission. It should be appreciated that the system may perform other functions, including network communication, and the invention is not limited to having any particular function or set of functions.

Figure 5:
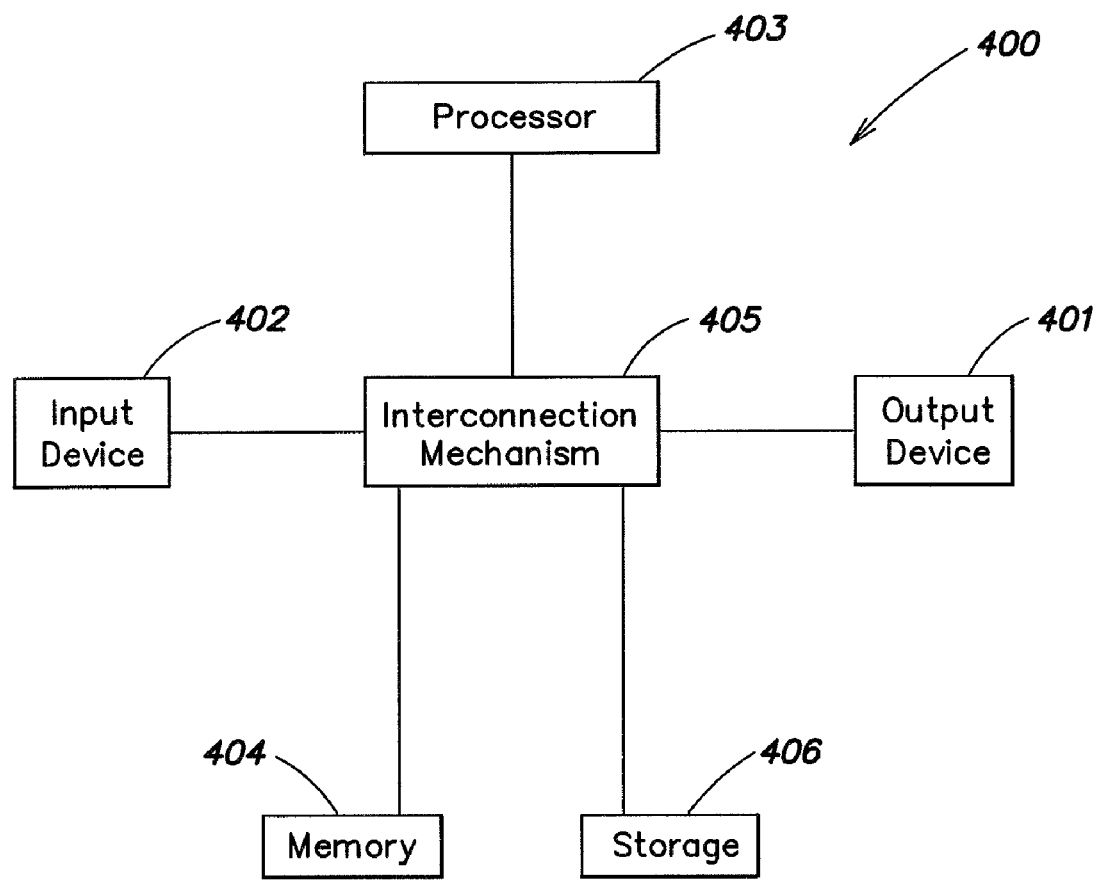
FIG. 5 is block diagram of a general-purpose computer system upon which various aspects of the present invention may be implemented.

For example, various aspects of the invention may be implemented as specialized to software executing in a general-purpose computer system 400 such as that shown in FIG. 5. The computer system 400 may include a processor 403 connected to one or more memory devices 404, such as a disk drive, memory, or other device for storing data. Memory 404 is typically used for storing programs and data during operation of the computer system 400. Components of computer system 400 may be coupled by an interconnection mechanism 405, which may include one or more busses (e.g., between components that are integrated within a same machine) and/or a network (e.g., between components that reside on separate discrete machines). The interconnection mechanism 405 enables communications (e.g., data, instructions) to be exchanged between system components of system 400. Computer system 400 also includes one or more input devices 402, for example, a keyboard, mouse, trackball, microphone, touch screen, and one or more output devices 401, for example, a printing device, display screen, speaker. In addition, computer system 400 may contain one or more interfaces (not shown) that connect computer system 400 to a communication network (in addition or as an alternative to the interconnection mechanism 405.

Figure 6:
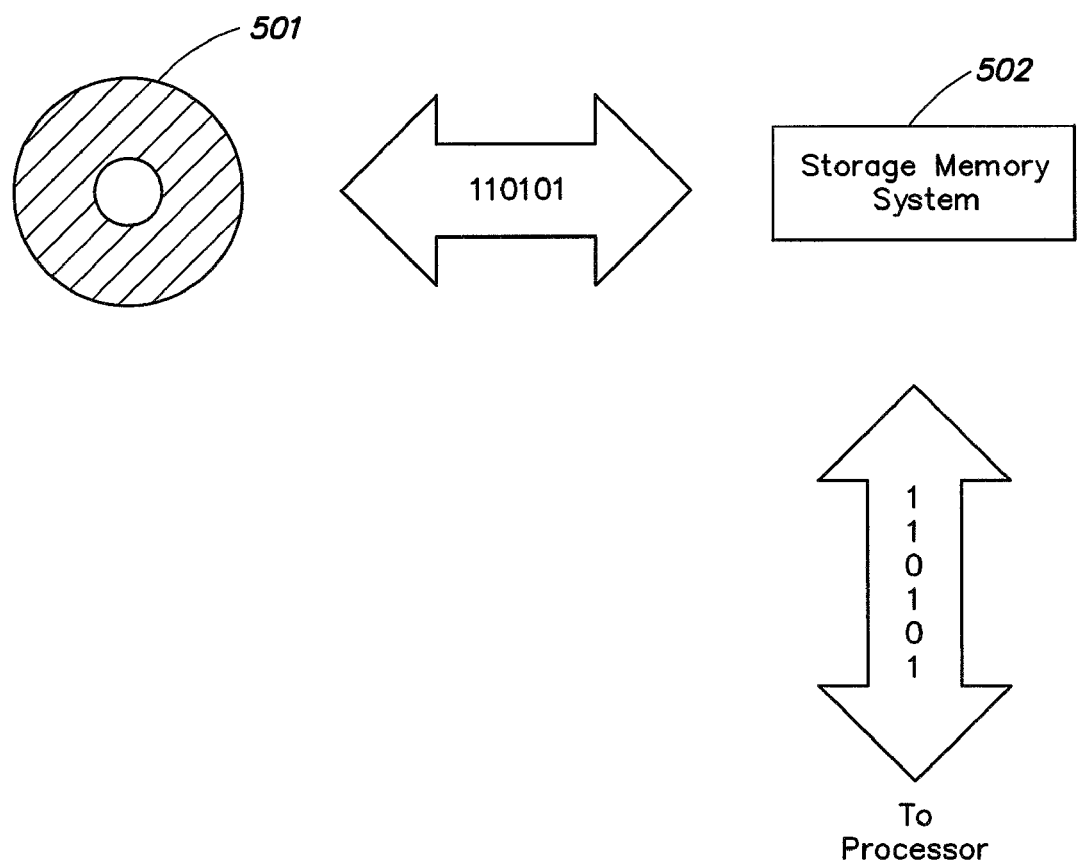
FIG. 6 is a computer data storage system that may be used in conjunction with various aspects of the present invention.

The storage system 406, shown in greater detail in FIG. 6, typically includes a computer readable and writeable nonvolatile recording medium 501 in which signals are stored that define a program to be executed by the processor or information stored on or in the medium 501 to be processed by the program. The medium may, for example, be a disk or flash memory. Typically, in operation, the processor causes data to be read from the nonvolatile recording medium 501 into another memory 502 that allows for faster access to the information by the processor than does the medium 501. This memory 502 is typically a volatile, random access memory such as a dynamic random access memory (DRAM) or static memory (SRAM). It may be located in storage system 406, as shown, or in memory system 404, not shown. The processor 403 generally manipulates the data within the integrated circuit memory 404, 502 and then copies the data to the medium 501 after processing is completed. A variety of mechanisms are known for managing data movement between the medium 501 and the integrated circuit memory element 404, 502, and the invention is not limited thereto. The invention is not limited to a particular memory system 404 or storage system 406.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 400 is shown by way of example as one type of computer system upon which various aspects of the invention may be practiced, it should be appreciated that aspects of the invention are not limited to being implemented on the computer system as shown in FIG. 5. Various aspects of the invention may be practiced on one or more computers having a different architecture or components that that shown in FIG. 5.

Computer system 400 may be a general-purpose computer system that is programmable using a high-level computer programming language. Computer system 400 may be also implemented using specially programmed, special purpose hardware. In computer system 400, processor 403 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME) or Windows XP operating systems available from the Microsoft Corporation, MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any means, known now or later developed, for performing the recited function.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, shall be closed or semi-closed transitional phrases, as set forth, with respect to claims, in the United States Patent Office Manual of Patent Examining Procedures (Original Eighth Edition, August 2001), Section 2111.03.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A computer implemented method for providing conditional access to electronic content, the method comprising acts of:
   providing, by a content provider computer, electronic content as a content data stream, to a plurality of users;
   providing for transmission of the content data stream, including the electronic content, to each of the plurality of users, through a network;
   providing, to each of the plurality of users, authorization information associated with the electronic content;
   inserting, by the content provider computer, the authorization information into the electronic content in the content data stream;
   controlling, by the content provider, access to the electronic content;
   allowing access to the electronic content in the content data stream in response to an indication by the authorization information in the content data stream that each of the plurality of users is authorized to use the electronic content; and
   wherein at least one of the plurality of users is provided authorization information via an Alternative Method of Entry (AMOE).

2. The method according to claim 1, wherein the act of providing authorization information includes an act of providing an authorization code, and the method further comprises an act of providing the authorization code to each of the plurality of users.

3. The method according to claim 2, further comprising an act of permitting each of the plurality of users to submit the provided authorization code.

4. The method according to claim 3, further comprises an act of permitting each of the plurality of users to submit the authorization code to a system onto which the electronic content is downloaded.

5. The method according to claim 1, wherein the electronic content is at least one of a group comprising music, audio, software, video and a game.

6. The method according to claim 1, wherein the act of providing the electronic content includes an act of downloading the electronic content to at least one system including at least one of a group comprising a set top box, a computer, a handheld computer and a telephone.

7. The method according to claim 1, wherein the act of providing the electronic content includes an act of downloading the electronic content from at least one of a cable television system or a satellite television system.

8. The method according to claim 6, wherein the act of downloading the electronic content includes an act of downloading the electronic content to a random access memory of the at least one system.

9. The method according to claim 1, wherein the act of permitting use of the electronic content further comprises an act of displaying video information on a screen to each of the plurality of users.

10. The method according to claim 1, wherein the act of displaying video information comprises an act of displaying the video information on a television to each of the plurality of users.

11. The method according to claim 9, wherein the act of displaying the video information further comprising displaying a game to each of the plurality of users.

12. The method according to claim 1, wherein at least a portion of the electronic content is a software program downloaded to a system associated with each of the plurality of users.

13. The method according to claim 12, wherein the act of permitting use of the electronic content includes an act of permitting use of the software program by each of the plurality of users.

14. The method according to claim 13, wherein the act of permitting use of the software program includes an act of allowing the software to view at least a second portion of the electronic content.

15. The method according to claim 1, further comprising act of maintaining the authorization information for a finite period of time.

16. The method according to claim 15, wherein the finite period is a period of a game session.

17. The method according to claim 2, wherein the act of providing authorization information to each user comprises acts of transmitting, to a system associated with each of the plurality of users, a second authorization code, comparing the second authorization code to the provided authorization code, and determining whether each of the plurality of users is authorized to use the electronic content based on the act of comparing.

18. The method according to claim 17, wherein the act of determining includes an act of allowing access to the electronic content if the act of comparing determines that the provided authorization code and the second authorization code match.

19. The method according to claim 17, wherein the act of determining includes an act of denying access to the electronic content if the act of comparing determines that the provided authorization code and the second authorization code do not match.

20. The method according to claim 17, wherein the act of transmitting the second authorization code includes an act of transmitting the second authorization code with at least one portion of the electronic content.

21. The method according to claim 17, wherein the second authorization code is transmitted in encrypted form to the system associated with each of the plurality of users, and is decrypted by the system.

22. The method according to claim 17, wherein the provided authorization code is encrypted by the system associated with each of the plurality of users and compared to the transmitted encrypted second authorization code.

23. A computer-readable medium having computer-readable signals stored thereon that define instructions that, as a result of being executed by a computer, instruct the computer to perform a method for providing conditional access to electronic content, the method comprising acts of:
 providing, by a content provider computer, electronic content as a content data stream to each of a plurality of users;
 providing for transmission of the content data stream, including the electronic content, to each of the plurality of users, through a network;
 providing, to each of the plurality of users, authorization information associated with the electronic content;
 inserting, by the content provider computer, the authorization information into the electronic content in the content data stream;
 controlling, by the content provider, access to the electronic content;
 allowing access to the electronic content in the content data stream in response to an indication by the authorization information in the content data stream that each of the plurality of users is authorized to use the electronic content; and
 wherein at least one of the plurality of users is provided authorization information via an Alternative Method of Entry (AMOE).

24. The computer-readable medium according to claim 23, wherein the act of providing authorization information includes an act of providing an authorization code, and the method further comprises an act of providing the authorization code to each of the plurality of users.

25. The computer-readable medium according to claim 24, wherein the method further comprises an act of permitting each of the plurality of users to submit the provided authorization code.

26. The computer-readable medium according to claim 25, wherein the method further comprises an act of permitting each of the plurality of users to submit the authorization code to a system onto which the electronic content is downloaded.

27. The computer-readable medium according to claim 23, wherein the electronic content is at least one of a group comprising music, audio, software, video and a game.

28. The computer-readable medium according to claim 23, wherein the act of providing the electronic content includes an act of downloading the electronic content to at least one system including at least one of a group comprising a set top box, a computer, a handheld computer and a telephone.

29. The computer-readable medium according to claim 23, wherein the act of providing the electronic content includes an act of downloading the electronic content from at least one of a cable television system or a satellite television system.

30. The computer-readable medium according to claim 28, wherein the act of downloading the electronic content includes an act of downloading the electronic content to a random access memory of the at least one system.

31. The computer-readable medium according to claim 23, wherein the act of permitting use of the electronic content further comprises an act of displaying video information on a screen to each of the plurality of users.

32. The computer-readable medium according to claim 31, wherein the act of displaying video information comprises an act of displaying the video information on a television to each of the plurality of users.

33. The computer-readable medium according to claim 31, wherein the act of displaying the video information further comprising displaying a game to each of the plurality of users.

34. The computer-readable medium according to claim 23, wherein at least a portion of the electronic content is a software program downloaded to a system associated with each of the plurality of users.

35. The computer-readable medium according to claim 34, wherein the act of permitting use of the electronic content includes an act of permitting use of the software program by each of the plurality of users.

36. The computer-readable medium according to claim 35, wherein the act of permitting use of the software program includes an act of allowing the software to view at least a second portion of the electronic content.

37. The computer-readable medium according to claim 23, wherein the method further comprises an act of maintaining the authorization information for a finite period of time.

38. The computer-readable medium according to claim 37, wherein the finite period is a period of a game session.

39. The computer-readable medium according to claim 24, wherein the act of providing authorization information to the users comprises acts of transmitting, to a system associated with each of the plurality of users, a second authorization code, comparing the second authorization code with the provided authorization code, and determining whether each of the plurality of users is authorized to use the electronic content based on the act of comparing.

40. The computer-readable medium according to claim 39, wherein the act of determining includes an act of allowing access to the electronic content if the act of comparing determines that the provided authorization code and the second authorization code match.

41. The computer-readable medium according to claim 39, wherein the act of determining includes an act of denying access to the electronic content if the act of comparing determines that the provided authorization code and the second authorization code do not match.

42. The computer-readable medium according to claim 39, wherein the act of transmitting the second authorization code includes an act of transmitting the second authorization code with at least one portion of the electronic content.

43. The computer-readable medium according to claim 39, wherein the second authorization code is transmitted after encryption and is decrypted after transmission by the system associated with each of the plurality of users.

44. The computer-readable medium according to claim 39, wherein the provided authorization code is encrypted by the system associated with each of the plurality of users and compared to the transmitted encrypted second authorization code.

45. A system for providing conditional access to electronic content, the system comprising:
    access to a network adapted to deliver a content data stream to a plurality of systems;
    wherein at least one of the plurality of systems comprises:
        a receiver that receives the content data stream and authorization information periodically inserted into the electronic content as part of the content data stream by a content provider computer;
        an authorization component that permits use, by each of a plurality of users, of the received content data stream in response to the authorization information provided to each of the plurality of users indicating that each of the plurality of users are authorized to use the electronic content; and
    wherein at least one of the plurality of users is provided authorization information via an Alternative Method of Entry (AMOE).

46. The system according to claim 45, wherein the receiver is adapted to receive an authorization code associated with each of the plurality of users.

47. The system according to claim 46, further comprising an interface that accepts, from each of the plurality of users, the received authorization code.

48. The system according to claim 45, wherein the electronic content is at least one of a group comprising music, audio, software, video and a game.

49. The system according to claim 45, wherein the system is at least one of a group comprising a set top box, a computer, a handheld computer and a telephone.

50. The system according to claim 45, wherein the receiver is adapted to receive the electronic content from at least one of a cable television system or a satellite television system.

51. The system according to claim 45, the system further comprising a memory adapted to store the received electronic content.

52. The system according to claim 51, wherein the memory is a random access memory.

53. The system according to claim 45, further comprising a display is adapted to display at least one portion of the electronic content to each of the plurality of users.

54. The system according to claim 53, wherein the display is a television adapted to display the at least one portion of the electronic content to each of the plurality of users.

55. The system according to claim 54, wherein the at least one portion of the electronic content displayed to each of the plurality of users is a game.

56. The system according to claim 45, wherein at least a portion of the received electronic content is a software program capable of being executed by the system.

57. The system according to claim 56, further comprising means for allowing each of the plurality of users to use the software program.

58. The system according to claim 56, further comprising means for allowing each of the plurality of users to view at least a second portion of the electronic content if each of the plurality of users are authorized.

59. The system according to claim 45, further comprising means for maintaining the authorization information for a finite period of time.

60. The system according to claim 45, wherein the finite period is a period of a game session.

61. The system according to claim 46, wherein the receiver is adapted to receive a second authorization code, and wherein the authorization component is adapted to compare the second authorization code with the authorization code associated with each of the plurality of users and determine whether each of the plurality of users is authorized to use the electronic content based on the comparison.

62. The system according to claim 61, wherein the authorization component is adapted to allow access to the electronic content if the authorization code associated with each of the plurality of users and the second authorization code match.

63. The system according to claim 61, wherein the authorization component is adapted to deny access to the electronic content if the authorization code associated with each of the plurality of users and the second authorization code do not match.

64. The system according to claim 61, wherein the receiver is configured to receive the second authorization code with at least one portion of the electronic content.

65. The system according to claim 61, wherein the receiver is adapted to receive the second authorization code in encrypted form, and is adapted to decrypt the received second authorization code.

66. The system according to claim 61, wherein the receiver is adapted to receive the second authorization code in encrypted form, and the authorization component is adapted to compare an encrypted form of the authorization code associated with each of the plurality of users with the encrypted form of the second authorization code.

67. The method of claim 1, wherein the at least one of the plurality of users gaining access via an AMOE logs onto a website to acquire the authorization information.

68. The computer-readable medium according to claim 23, wherein the at least one of the plurality of users gaining access via an AMOE logs onto a website to acquire the authorization information.

69. The system according to claim 45, wherein the at least one of the plurality of users gaining access via an AMOE logs onto a website to acquire the authorization information.

* * * * *